United States Patent

Marrion

[11] Patent Number: 5,304,607
[45] Date of Patent: Apr. 19, 1994

[54] COATING COMPOSITIONS

[75] Inventor: Alastair R. Marrion, Northumberland, United Kingdom

[73] Assignee: Courtaulds Coatings (Holdings) Limited, London, United Kingdom

[21] Appl. No.: 781,230

[22] PCT Filed: Jul. 3, 1990

[86] PCT No.: PCT/GB90/01027
§ 371 Date: Dec. 31, 1991
§ 102(e) Date: Dec. 31, 1991

[87] PCT Pub. No.: WO91/00321
PCT Pub. Date: Jan. 10, 1991

[30] Foreign Application Priority Data

Jul. 4, 1989 [GB] United Kingdom ............... 8915356

[51] Int. Cl.$^5$ .............. C08L 31/00; C08L 35/00; C08L 71/02
[52] U.S. Cl. .............. 525/186; 525/102; 525/131; 525/167; 525/183; 525/207; 525/406; 525/454
[58] Field of Search .............. 525/102, 131, 167, 186, 525/207, 406, 454, 183

[56] References Cited

U.S. PATENT DOCUMENTS

| | | | |
|---|---|---|---|
| 3,985,928 | 10/1976 | Watanabe et al. | 428/273 |
| 4,452,948 | 6/1984 | Marrion et al. | 525/207 |
| 4,497,663 | 2/1985 | Fisher et al. | 134/4 |
| 4,510,274 | 4/1985 | Okazaki et al. | 523/411 |
| 4,798,745 | 1/1989 | Martz et al. | 427/407.1 |
| 4,798,746 | 1/1989 | Claar et al. | 525/207 |
| 4,876,921 | 10/1989 | Yasui et al. | 74/710.5 |

FOREIGN PATENT DOCUMENTS

| | | |
|---|---|---|
| 0073022 | 3/1983 | European Pat. Off. |
| 0168139 | 1/1986 | European Pat. Off. |
| 0204158 | 12/1986 | European Pat. Off. |
| 0243513 | 11/1987 | European Pat. Off. |
| 0282184 | 9/1988 | European Pat. Off. |
| 0284953 | 10/1988 | European Pat. Off. |
| 1353546 | 5/1974 | United Kingdom. |
| 2101141 | 1/1983 | United Kingdom. |

*Primary Examiner*—James J. Seidleck
*Assistant Examiner*—Thomas Hamilton, III
*Attorney, Agent, or Firm*—Eckert Seamans Cherin & Mellott

[57] ABSTRACT

A coating composition which is capable of curing at ambient temperature to form a coating comprises (A) an anhydride-functional polymer containing at least two cyclic carboxylic acid anhydride groups per molecule and (B) an amine-functional polymer and is characterized in that the amine-functional polymer (B) contains at least two secondary amine groups per molecule, the polymer (B) being substantially free from hydroxy and ether oxygen atoms and amine nitrogen atoms in the alpha and beta positions with respect to the amine nitrogen atoms, and the carbon atoms directly bonded to the amine nitrogen atoms not being tertiary carbon atoms.

7 Claims, No Drawings

COATING COMPOSITIONS

TECHNICAL FIELD

This invention relates to a coating composition capable of curing at ambient temperature.

BACKGROUND ART

U.S. Pat. No. 4,452,948 describes a coating composition suitable for use as a glossy pigmented coating for a rigid substrate, particularly where hardening of the coating at ambient temperatures is required, for example as a vehicle refinishing paint. The coating composition comprises a hydroxy component having at least two free hydroxyl groups per molecule and an anhydride component having at least two cyclic carboxylic acid anhydride groups per molecule, at least one of these components being a film-forming polymer. The composition also includes a catalytically effective amount of amine groups for accelerating the curing reaction between the hydroxyl groups and the anhydride groups. The amine groups are preferably incorporated in the molecule of the hydroxy component. Tertiary amine groups are preferred although certain secondary amine groups, for example those containing tertiary alkyl groups such as polymerised units of t-butylaminoethyl methacrylate, can be used.

European Patent 73022 describes an anhydride-functional polyester and claims its use as a hardener for compounds having free epoxide, amine or hydroxyl groups. European Patent Application 282184 describes a grease-compatible, plasticiser-extended encapsulant for spliced electrical or optical cable comprising an anhydride-functionalised composition and a crosslinking agent such as a polyol, polyamine or polythiol.

European Patent Application 259172 describes a coating composition comprising an anhydride polymer containing at least two cyclic carboxylic acid anhydride groups and a polymer containing at least two functional groups reactive with anhydride groups. These reactive groups are selected from hydroxyalkylamino, hydroxyalkoxyalkylamino, hydroxy-substituted acyloxyalkylamino, hydroxy-substituted polyacyloxyalkylamino, mercaptoalkylamino and oxazolidino groups. One of the polymers comprises a flexible polymer chain selected from polyether, polyester, silicone, diene polymer, hydrogenated diene polymer, polyurethane, polyisobutylene and polyacrylate chains. The functional groups characteristic of that polymer are each present as a terminal group at the end of a flexible polymer chain. The cured coatings have increased resistance to impact and abrasion. The hydroxyalkylamino groups are preferably tertiary amino groups but can be secondary amino groups formed for example from the reaction of a primary amino group with an epoxide or from the reaction of a carboxy-tipped polymer with N-hydroxyethyl imine.

Disclosure of Invention

A coating composition according to the present invention comprises (A) an anhydride-functional polymer containing at least two cyclic carboxylic acid anhydride groups per molecule and (B) an amine-functional polymer and is characterised in that the amine-functional polymer (B) contains at least two secondary amine groups per molecule, the polymer (B) being substantially free from hydroxy and ether oxygen atoms and amino nitrogen atoms in the alpha and beta positions with respect to the amine nitrogen atoms, and the carbon atoms directly bonded to the amine nitrogen atoms not being tertiary carbon atoms.

By secondary amine groups we mean groups in which an —NH-group is directly bonded to two carbon atoms which themselves are directly bonded only to carbon or hydrogen atoms. By tertiary carbon atoms we mean carbon atoms which are directly bonded to three other carbon atoms.

The amine-functional polymer (B) is preferably substantially free from hydroxyl groups. The number of primary amine groups in polymer (B) preferably amounts to no more than 10% of the total number of primary and secondary amine groups in the said polymer.

The coating compositions of the invention cure by reaction of the anhydride groups of polymer (A) with the secondary amine groups of polymer (B) to form amide linkages. The resulting cured polymer with amide crosslinks is more resistant to hydrolysis than the polymers of U.S. Pat. No. 4,452,948 and European Patent Application 259172, which contain ester crosslinks formed by the reaction of anhydride groups with hydroxyl groups and unchanged tertiary amine or hindered secondary amine groups.

Compositions in which the amine-functional polymer (B) contains only primary amine groups fall outside the scope of the present invention. Such compositions have an unacceptably short pot-life when used as coating compositions. Secondary amines react considerably more slowly with carboxylic acid anhydrides than do primary amines, so removing this disadvantage. Secondary amines in which the nitrogen atom is directly bonded to a tertiary carbon atom react too slowly with carboxylic acid anhydrides to give an acceptably short curing time for a coating composition.

Amides which contain a hydroxy or ether oxygen atom (as in hydroxyalkoxy, hydroxy-substituted acyloxy or hydroxy-substituted polyacyloxy groups) or amino nitrogen atom in the alpha or beta position with respect to the amide nitrogen atom exhibit a poorer resistance to hydrolysis than those which do not contain such groups. The former type of grouping is therefore undesirable in a cured coating composition.

The amine-functional polymer (B) can for example be a polyether, polyester, polyamide, acrylic polymer, silicone, diene polymer, hydrogenated diene polymer, polyurethane or polyisobutylene. The secondary amine groups are preferably present as terminal groups at the ends of a polymer chain; for best impact resistance they are preferably present at the ends of a flexible polymer chain as described in European Patent Application 259172.

Polymers tipped with secondary amine groups are not generally available commercially but can be prepared from polymers containing primary amine groups by an alkylation reaction. The primary amine-functional polymer can for example be reacted with an alkyl halide, especially a bromide or chloride such as methyl bromide or ethyl bromide, or with an alkyl sulphate or sulphonate ester such as dimethyl sulphate or methyl p-toluenesulphonate. Such an alkylation reaction is preferably carried out in organic solution in the presence of a base, for example a tertiary amine such as triethylamine or an alkali metal salt of a weak acid such as sodium or potassium carbonate.

An alternative alkylation reaction is a Michael-type addition reaction between a primary amine and an alpha, beta-unsaturated carbonyl or carboxy compound. The reaction is preferably carried out at 50° to 200° C. in a polar organic solvent. For example, a primary amine-functional polymer can be reacted with an ester of an alpha, beta-unsaturated carboxylic acid

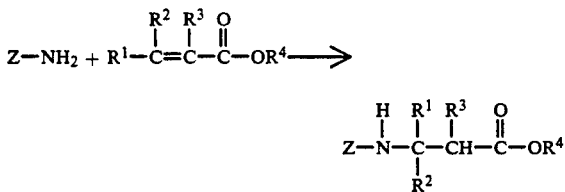

where Z represents a radical of the polymer molecule; $R^1$, $R^2$ and $R^3$ each independently represent hydrogen or a monovalent organic group linked through a carbon atom, for example an alkyl group; and $R^4$ represents an alkyl or aryl group which can be substituted. Examples of suitable unsaturated carboxy compounds are esters of acrylic or methacrylic acid or diesters of maleic, fumaric or itaconic acid, for example methyl acrylate, ethyl acrylate, butyl acrylate, methyl methacrylate or dimethyl fumarate.

The primary amine-functional polymer can alternatively be reacted with an unsaturated ketone

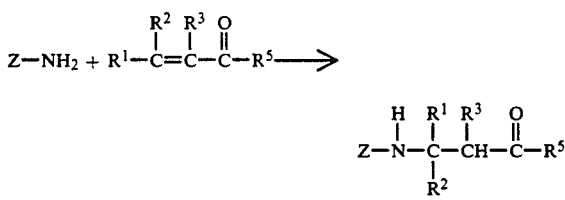

where Z, $R^1$, $R^2$ and $R^3$ are each as defined above and $R^5$ represents an alkyl or aryl group which can be substituted. An example of a suitable unsaturated ketone is mesityl oxide $(CH_3)_2C=CHCOCH_3$.

Examples of primary amine-functional polymers suitable for reaction with the unsaturated carbonyl or carboxy compound include amine-tipped polyethers. Examples which are commercially available include poly(tetramethylene oxide) of various molecular weights from 750 to 2,200 tipped with 3-aminopropyl groups, polypropylene oxide of molecular weights from 400 to 3,000 tipped with aminoalkyl groups and low molecular weight polyetheramines such as 4,7,10-trioxatridecane-1,13-diamine. Aminoalkyl-tipped polydiorganosiloxanes are also commercially available. Other primary amine-functional polymers can be prepared from carboxylic acid-functional polymers, for example copolymers of acrylic or methacrylic acid, by reaction with aziridine.

The Michael addition reaction can also be used to introduce amine groups into an ethylenically unsaturated polymer. For example, a polyester having ethylenically unsaturated end groups can be formed by reacting a minor proportion of an unsaturated monocarboxylic acid such as acrylic or methacrylic acid with the glycol and polycarboxylic acid or anhydride reagents used to prepare the polyester. The polyester containing the acrylic or methacrylic residue can be reacted, preferably in a hydrocarbon solvent such as toluene, with a primary amine to form secondary amine groups. Alternatively, an ethylenically unsaturated polyester can be formed using units derived from maleic acid or anhydride, itaconic acid or fumaric acid and can be reacted with a primary amine to introduce pendent secondary amine groups spaced along the polyester molecule.

An amine-functional polyamide can be produced by the reaction of a dicarboxylic acid with an excess of a diamine. One preferred type of dicarboxylic acid is a fatty acid dimer. The diamine can be a secondary amine, in which case a secondary amine-tipped polyamide is produced directly, or a primary amine, in which case a primary amine-tipped polyamide is formed which can be alkylated as described above.

A carboxy-functional polymer, for example a carboxy-tipped polyester, can be reacted with an N-alkyl ethylenimine to introduce $-COOCH_2CH_2NHR^6$ groups, where $R^6$ represents alkyl. A polyurethane having isocyanate end groups can be reacted with a protected primary amine such as the ketimine of aminoethanol to introduce aminoalkyl, for example aminoethyl, groups bonded to the polymer through a urethane linkage. The amine groups can be alkylated to secondary amine groups as described above.

Primary amines can react with ketones which have at least one hydrogen atom in an alpha position to the carbonyl group to form enamines that are vinyl-substituted secondary amines:

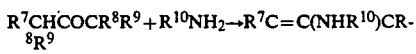

where $R^7$ is a monovalent organic group linked through a carbon atom to the remainder of the molecule and may be alkyl but is preferably an unsaturated group such as acryl or aryl capable of stabilising the enamine by conjugation; $R^8$ and $R^{10}$ are monovalent organic groups linked through a carbon atom to the remainder of the molecule, for example alkyl or aryl; and $R^9$ is hydrogen or has the structure defined for $R^8$ and $R^{10}$. This reaction can be utilised to prepare secondary amine-functional polymers suitable for use as component B. In one alternative, a primary amine-functional polymer of any of the types hereinbefore mentioned is reacted with a keto-functional compound such as ethyl acetoacetate to convert the primary amine groups to secondary amine groups. In another alternative, a keto-functional polymer is reacted with a primary amine to introduce secondary amine groups into the polymer.

The anhydride-functional polymer (A) is preferably an addition polymer of an ethylenically unsaturated cyclic anhydride, for example maleic, itaconic or citraconic anhydride. The anhydride-functional polymer is usually a copolymer with one or more ethylenically unsaturated comonomers. Preferred copolymers contain 10 to 50% by weight maleic or itaconic anhydride units. The anhydride-functional polymer may contain a vinyl comonomer such as styrene or a substituted styrene, vinyl chloride or vinyl acetate. If the coating is to be used as a decorative top coat it may be preferred to use such a vinyl comonomer at a molar ratio of at least 1:1 to the anhydride monomer, as described in U.S. Pat. No. 4,798,745. The anhydride-functional polymer preferably contains units of one or more esters of acrylic or methacrylic acid, for example butyl acrylate or methacrylate, methyl methacrylate or acrylate, ethyl acrylate or methacrylate or propyl, n-hexyl, isopropyl, t-butyl, 2-ethylhexyl, cyclohexyl, 3,3,5-trimethylcyclohexyl or isobornyl acrylate or methacrylate. The molecular weight of the anhydride-functional polymer is preferably in the range 1,000 to 50,000.

The anhydride component (A) can alternatively be an anhydride adduct of a diene polymer such as maleinised polybutadiene or a maleinised copolymer of butadiene, for example a butadiene/styrene copolymer. Maleinised polymers of this type have high reactivity with the amine-functional polymer (B) but are less preferred than the ethylenic copolymers described above because they form cured coatings which are not as hard. An anhydride adduct of an ethylenically unsaturated fatty acid ester, for example a styrene/allyl alcohol copolymer esterified with an ethylenically unsaturated fatty acid and maleinised, can also be used. Terpene/maleic anhydride copolymer resins are a further alternative.

Alternative anhydride-containing polymers can be formed from hydroxy-containing polymers, for example copolymers of hydroxyethyl acrylate or hydroxyethyl methacrylate or styrene/allyl alcohol copolymers, by reaction with a tricarboxylic compound capable of introducing anhydride groups, for example as described in European Patent Application 259172. A further alternative type of polymer containing anhydride groups is an adduct of trimellitic anhydride and a polyol, for example as described in European Patent Application 134691. The polymer containing anhydride groups can alternatively be formed by the reaction of a polymer containing thiol groups with an ethylenically unsaturated cyclic carboxylic acid anhydride such as maleic anhydride or itaconic anhydride. The polymer containing thiol groups is preferably thiol-tipped; it can for example be a multi-limbed telechelic polymer formed by reaction of a corresponding hydroxy-tipped polymer with mercaptoacetic acid.

The amounts of anhydride-functional polymer (A) and amine-functional polymer (B) in the coating composition of the invention are preferably such as to provide a ratio of equivalents of anhydride groups to equivalents of amine groups in the range 1:3 to 3:1, most preferably 1:1.2 to 1.2:1.

The coating composition of the invention is preferably an organic solvent-based composition. The solvent is chosen so that the anhydride-functional polymer (A) and the amine-functional polymer (B) are soluble to the desired extent and are compatible with one another in solution. Organic solvents which can be used are for example aromatic hydrocarbons such as xylene, toluene or trimethylbenzene, esters such as butyl acetate, ethoxyethyl acetate or methoxypropyl acetate, ketones such as methyl isobutyl ketone or methyl isoamyl ketone and halogenated hydrocarbons such as methylene chloride, chloroform or trichloroethane.

The coating composition of the invention is generally a two-pack coating in which the anhydride-functional polymer (A) and the amine-functional polymer (B) are stored separately and are mixed shortly before use. The coating can be applied to the substrate by spray, for example conventional airless spray or twin-feed spray in which the polymers (A) and (B) are not mixed until the spray head, or by roller or brush or by dipping or flow coating. The coating composition can be applied to a wide variety of substrates, particularly to rigid substrates such as metal, wood, glass or plastics. The compositions can be applied over most commercially sold primers. The coating is generally capable of curing on the substrate to a tough, tack-free film within 24 hours at ambient temperatures, for example 10° to 40° C. Curing may be carried out at temperatures above ambient, for example up to 100° C. or 150° C., for shorter times if this is more convenient, for example when coating under factory conditions.

The coating composition can contain one or more additional ingredients. It will usually contain one or more pigments which can be opaque or translucent pigments or metallic flake pigments and optionally one or more fillers. Alternatively, the coating composition may be unpigmented, for example for use as the top transparent clear coat in a "clear on base" coating system used as an automotive paint, particularly a paint for vehicle refinishing. The coating composition can contain one or more plasticisers, antioxidants, UV stabilisers or flow control agents, including additives for imparting thixotropy or sag resistance or pigment orientation. In two-pack compositions such additional ingredients are preferably included in the amine-functional polymer component of the paint. The coating composition can if desired contain a tertiary amine catalyst although such tertiary amine catalyst is generally not necessary. If a tertiary amine catalyst is used it can be a separate compound such as N,N-dimethylcocoamine, or tertiary amine groups can be incorporated in the molecule of the amine-functional polymer (B).

The invention is illustrated by the following Examples.

EXAMPLE 1

(a) Preparation of Anhydride Copolymer 650 g styrene, 150 g methyl methacrylate, 200 g itaconic anhydride and 40 g azo bis-2,2'-(2-methylbutyronitrile) initiator were mixed and run into refluxing butyl acetate (1,000 g) over 4 hours. When addition was complete, reflux was maintained for a further 2 hours to provide a polymer solution of solids content 50% by weight, anhydride equivalent weight 560 and number average molecular weight Mn 4,500.

(b) Preparation of Amine-Functional Polymer 85 g bis(aminopropyl)-tipped poly(tetramethylene oxide) of molecular weight 750 and 20 g ethyl acrylate were dissolved in 200 g chloroform with 5 g triethylamine and 2 g hydroquinone. The solution was refluxed for three hours and allowed to stand overnight. Volatile materials were removed by rotary evaporation, leaving a clear yellow oil which was a polyether tipped with —NHCH$_2$CH$_2$COOC$_2$H$_5$ groups.

(c) Coating Composition 5.6 g of the anhydride copolymer solution produced in (a) above was mixed with 2.6 g of the amine-functional polymer produced in (b) above, diluted with 1 g methyl ethyl ketone. The coating composition produced was cast on glass plates at 75 microns wet-film thickness and was allowed to cure at room temperature (about 20° C.) for three days. Its solvent resistance was then tested by rubbing with a cloth soaked in methyl ethyl ketone (MEK). The solvent resistance was 40 MEK double rubs.

EXAMPLE 2

The process of Example 1b was repeated using 40 g methyl methacrylate in place of the ethyl acrylate. The polymer produced was used in place of the polymer of Example 1b in preparing a coating composition according to Example 1c. The cured film had a solvent resistance of 70 MEK double rubs.

EXAMPLE 3

The process of Example 1b was repeated using 19.6 g mesityl oxide in place of the ethyl acrylate. The polymer produced was used in place of the polymer of Example 1b in a coating composition prepared according to Example 1c. The solvent resistance of the cured coating was 100 MEK double rubs.

EXAMPLE 4

(a) Preparation of amine-functional polymer 85 g of the bis(aminopropyl) polyether used in Example 1b was mixed with 22 g ethyl bromide and 50 g triethylamine in 200 g ethanol. The reaction mixture was refluxed for three hours and was allowed to stand overnight. The product was diluted with 200 g xylene and was filtered to remove the precipitated triethylamine hydrobromide. The filtrate was then subjected to rotary evaporation to remove volatile materials, yielding a clear yellow oil which was a polyether tipped with N-ethylaminopropyl groups.

(b) Coating composition 5.6 g of the anhydride copolymer solution produced in Example 1a was mixed with 2.25 g of the amine-functional polymer produced in Example 4a, diluted with 1 g methyl ethyl ketone. The coating composition was applied to glass plates and cured as described in Example 1. The cured coating had a solvent resistance of 100 MEK double rubs.

What we claim is:

1. A coating composition, comprising:
   (A) An anhydride-functional polymer containing at least two cyclic carboxylic acid anhydride groups per molecule, and
   (B) an amine-functional polymer, wherein the amine-functional polymer (B) contains at least two secondary amine groups per molecule, and wherein in said amine-functional polymer (B) the alpha and beta positions with respect to the amine nitrogen atoms are substantially free from hydroxy and ether oxygen atoms and from amino nitrogen atoms, and wherein in said amine-functional polymer (B) the carbon atoms directly bonded to the amine nitrogen atoms are not tertiary carbon atoms.

2. A coating composition according to claim 1, in which the amine-functional polymer (B) is substantially free from hydroxyl groups.

3. A coating composition according to claim 1, in which the number of primary amine groups in the amine-functional polymer (B) amounts to no more than 10% of the total number of primary and secondary amine groups in said polymer (B).

4. A coating composition according to claim 1, in which the amine-functional polymer (B) is a polyether, polyester, polyamide, acrylic polymer, silicone, diene polymer, hydrogenated diene polymer, polyurethane or polyisobutylene and the secondary amine groups are present as terminal groups at the ends of a polymer chain.

5. A coating composition according to claim 1, in which the anhydride-functional polymer (A) is an addition polymer of an ethylenically unsaturated cyclic anhydride.

6. A coating composition according to claim 5, in which the anhydride-functional polymer (A) is a copolymer containing 10 to 50% by weight of maleic or itaconic anhydride units.

7. A coating composition according to claim 1, in which the amount of anhydride-functional polymer (A) and amine-functional polymer (B) are such as to provide a ratio of equivalents of anhydride groups to equivalents of amine groups of 1:1.2 to 1.2:1.

* * * * *